(12) United States Patent
Orrell (10) Patent No.: US 7,429,072 B2
(45) Date of Patent: Sep. 30, 2008

(54) VEHICLE ENCLOSURE

(75) Inventor: Gary Orrell, Milbury, MA (US)

(73) Assignee: Curtis Industries, LLC, Worcester, MA (US)

(*) Notice: Subject to any disclaimer, the term of this patent is extended or adjusted under 35 U.S.C. 154(b) by 14 days.

(21) Appl. No.: 10/974,451

(22) Filed: Oct. 27, 2004

(65) Prior Publication Data

US 2006/0087149 A1 Apr. 27, 2006

(51) Int. Cl.
*B60J 7/00* (2006.01)
(52) U.S. Cl. .............. 296/146.12; 296/202; 49/246; 280/DIG. 5
(58) Field of Classification Search ............ 296/146.12, 296/202; 49/246; 280/DIG. 5
See application file for complete search history.

(56) References Cited

U.S. PATENT DOCUMENTS

| | | | |
|---|---|---|---|
| 2,460,399 A | 2/1949 | Schassberger | 296/148 |
| 2,682,427 A | 6/1954 | Bright | 296/148 |
| 3,387,406 A | 6/1968 | Coker et al. | 296/50 |
| 3,454,299 A | 7/1969 | Hewitt et al. | 296/50 |
| 3,567,274 A | 3/1971 | Kaptur, Jr. et al. | 296/50 |
| 3,592,504 A | 7/1971 | Sandor | 296/70 |
| 3,623,764 A | 11/1971 | Jacobus | 296/50 |
| 3,747,273 A | 7/1973 | Johnson | 49/394 |
| 4,076,301 A | 2/1978 | Gergoe | 296/57.1 |
| 4,133,574 A | 1/1979 | Martin | 296/28 |
| 4,299,058 A | 11/1981 | Spaulding | 49/386 |
| 4,335,911 A | 6/1982 | Taylor | 292/262 |
| 4,372,603 A | 2/1983 | Stanczak et al. | 296/146.12 |
| 4,437,410 A | 3/1984 | Stoller et al. | 105/378 |
| 4,621,859 A | 11/1986 | Spicher | 296/78 R |
| 4,773,694 A | 9/1988 | Gerber | 296/77.1 |
| 4,929,004 A | 5/1990 | Chidester | 292/267 |
| 4,932,714 A | 6/1990 | Chance | 296/148 |
| 5,004,286 A | 4/1991 | Taylor et al. | 296/24.46 |
| 5,203,601 A | 4/1993 | Guillot | 296/77.1 |
| 5,217,275 A | 6/1993 | Ridge | 296/77.1 |
| 5,259,656 A | 11/1993 | Carroll | 296/77.1 |
| 5,276,745 A | 1/1994 | Revelli, Jr. | 385/14 |
| 5,310,235 A | 5/1994 | Seymour et al. | 296/77.1 |
| 5,388,881 A | 2/1995 | Spencer et al. | 296/77.1 |
| 5,393,118 A | 2/1995 | Welborn | 296/147 |

(Continued)

OTHER PUBLICATIONS

"Undated" brochure; Mobile Equipment Enclosures Ltd.

(Continued)

*Primary Examiner*—Joseph D Pape
(74) *Attorney, Agent, or Firm*—Nields & Lemack (57) ABSTRACT

Accessory door assembly for the normally open sides of a recreational vehicle such as a golf cart. The door assembly includes a doorframe that can be secured to the vehicle, and a preferably rigid door that is easily mountable and demountable, and is movable between an open position and a closed position. The door can be secured to the vehicle in the open position so that the passengers have the option of riding in the vehicle while the door remains open. The door is contoured to match the contour of the vehicle, so that even when the door is stored in the open position, the vehicle remains aesthetically pleasing. A hinge system is utilized that minimizes the clearance necessary to open and close the door, and provides an optional assist feature that helps urge or bias the door to the open or closed position and maintain it there.

18 Claims, 12 Drawing Sheets

U.S. PATENT DOCUMENTS

| | | | |
|---|---|---|---|
| 5,404,618 A | 4/1995 | Heiler et al. | 16/261 |
| 5,429,404 A | 7/1995 | King, Sr. et al. | 296/79 |
| D363,265 S | 10/1995 | Althoff | D12/16 |
| 5,529,369 A | 6/1996 | Welborn | 296/77.1 |
| 5,544,449 A | 8/1996 | Amelio et al. | 49/383 |
| 5,588,690 A | 12/1996 | Showalter | 296/77.1 |
| 5,632,065 A | 5/1997 | Siladke et al. | 16/335 |
| 5,685,594 A | 11/1997 | Harper | 296/51 |
| D413,283 S | 8/1999 | Stepp et al. | D12/16 |
| 6,030,024 A | 2/2000 | Schmidhuber et al. | 296/146.12 |
| 6,158,801 A | 12/2000 | Tucker | 296/146.1 |
| 6,161,336 A | 12/2000 | Ziv-Av | 49/260 |
| 6,213,535 B1 * | 4/2001 | Landmesser et al. | 296/146.12 |
| 6,276,745 B1 | 8/2001 | Wilson | 296/155 |
| 6,293,610 B1 | 9/2001 | Howard | 296/148 |
| 6,382,705 B1 | 5/2002 | Lang et al. | 296/155 |
| 6,412,877 B1 | 7/2002 | Faison | 296/183.2 |
| 6,439,637 B1 | 8/2002 | Tyrer | 296/79 |
| 6,547,304 B1 | 4/2003 | Conner et al. | 296/79 |
| 6,658,803 B2 | 12/2003 | Szyjkowski | 52/213 |
| 6,742,826 B2 | 6/2004 | Humphrey et al. | 296/51 |
| 6,748,776 B2 | 6/2004 | Bullock et al. | 70/212 |
| 6,764,130 B1 | 7/2004 | Hull | 296/186.4 |
| 6,773,055 B1 | 8/2004 | Stoudt et al. | 296/153 |
| 6,776,445 B1 | 8/2004 | Conner et al. | 296/79 |
| 6,779,825 B1 | 8/2004 | Greenert et al. | 296/51 |
| D498,436 S | 11/2004 | Bonner et al. | D12/16 |
| D498,704 S | 11/2004 | Bonner et al. | D12/16 |
| 6,827,390 B2 | 12/2004 | Zummallen et al. | 296/146.11 |
| 6,942,277 B2 | 9/2005 | Rangnekar et al. | 286/146.11 |
| D515,458 S | 2/2006 | Tolfsen et al. | D12/85 |
| 6,997,504 B1 | 2/2006 | Lang et al. | 296/146.12 |
| 7,070,225 B2 | 7/2006 | Herrmann | 296/146.6 |
| 7,080,868 B2 | 7/2006 | McClure et al. | 296/146.11 |
| 7,096,538 B2 | 8/2006 | Liang et al. | 296/146.11 |
| 7,147,257 B2 | 12/2006 | Johansen et al. | 292/341.15 |
| 7,150,486 B2 | 12/2006 | Ichinose | 296/51 |
| 7,165,800 B2 | 1/2007 | Thiele et al. | 296/57.1 |
| 2005/0110298 A1 | 5/2005 | Fin et al. | 296/146.5 |
| 2005/0127712 A1 | 6/2005 | Castillo | 296/146.12 |
| 2006/0087145 A1 | 4/2006 | Curtis et al. | 296/80 |
| 2006/0087149 A1 | 4/2006 | Curtis et al. | 296/146.1 |
| 2006/0087150 A1 | 4/2006 | Curtis et al. | 296/146.1 |

OTHER PUBLICATIONS

United Kingdom communication dated Aug. 17, 2007.

* cited by examiner

VEHICLE ENCLOSURE

BACKGROUND OF THE INVENTION

Enclosures for vehicles, including battery powered or gas powered vehicles such as recreational vehicles, golf carts, neighborhood electric vehicles (NEV'S, which can be street-legal) and utility vehicles to protect the occupants from inclement weather are well known. In general, conventional golf cart enclosures utilize relatively flimsy fabric material, which can be draped over the golf cart and/or golf cart roof and secured in place such as with zippers, VELCRO or other fastening means. In addition to being unattractive, such enclosures suffer from various drawbacks, including difficulty in obtaining ingress and egress from the cart, soiling of the fabric, lack of durability of the fabric and/or the fastening means, a requirement that the doors remain closed during operation of the cart, etc.

For example, U.S. Pat. No. 6,158,801 to Tucker discloses a golf cart enclosure that encloses the rear of the cart as well as both sides of the occupants' compartment or cabin. The side enclosures utilize a top and bottom parallel channel system, with wheels that are guided in the channels to move the door open and shut. The door includes a plurality of vertical aluminum bars that support a vinyl panel.

U.S. Pat. No. 6,293,610 to Howard discloses a door system for a golf cart-like street legal vehicle. A pair of hinged doors is removable from framework on each side of the vehicle. The framework is permanently mounted to existing structure on the vehicle.

U.S. Pat. No. 4,932,714 to Chance discloses a demountable door for a golf cart. The door includes a panel of clear plastic that is linked to the cart and is movable to allow access to the cart.

None of the foregoing embodiments provides an aesthetically pleasing, durable, weather resistant, easy to operate, readily removable door system for vehicles such as golf carts. In addition, none provides a door assembly where the door can be stored in the open position in an aesthetically pleasing manner and without risk of it unexpectedly and/or undesirably slamming shut during movement of the vehicle.

SUMMARY OF THE INVENTION

The problems of the prior art have been overcome by the present invention, which provides an accessory door assembly for the normally open sides of a vehicle such as a recreational vehicle, NEV, utility vehicle, or golf cart. The door assembly includes a doorframe that can be secured to the vehicle, and a preferably rigid door that is easily mountable and demountable, and is movable between an open position allowing ingress and egress from the vehicle, and a closed position. The door can be secured to the vehicle in the open position so that the passengers have the option of riding in the vehicle while the door remains open. Preferably the door is contoured to match the contour of the vehicle, so that even when the door is stored in the open position, the vehicle remains aesthetically pleasing. A unique hinge system is utilized that minimizes the clearance necessary to open and close the door, and provides an optional assist feature that helps urge or bias the door to the open or closed position and maintain it there. The door assembly remains aerodynamic and aesthetically pleasing whether in the open or closed position. Minimal modification of the vehicle is necessary to install the door.

DETAILED DESCRIPTION OF THE INVENTION

Figure 1:
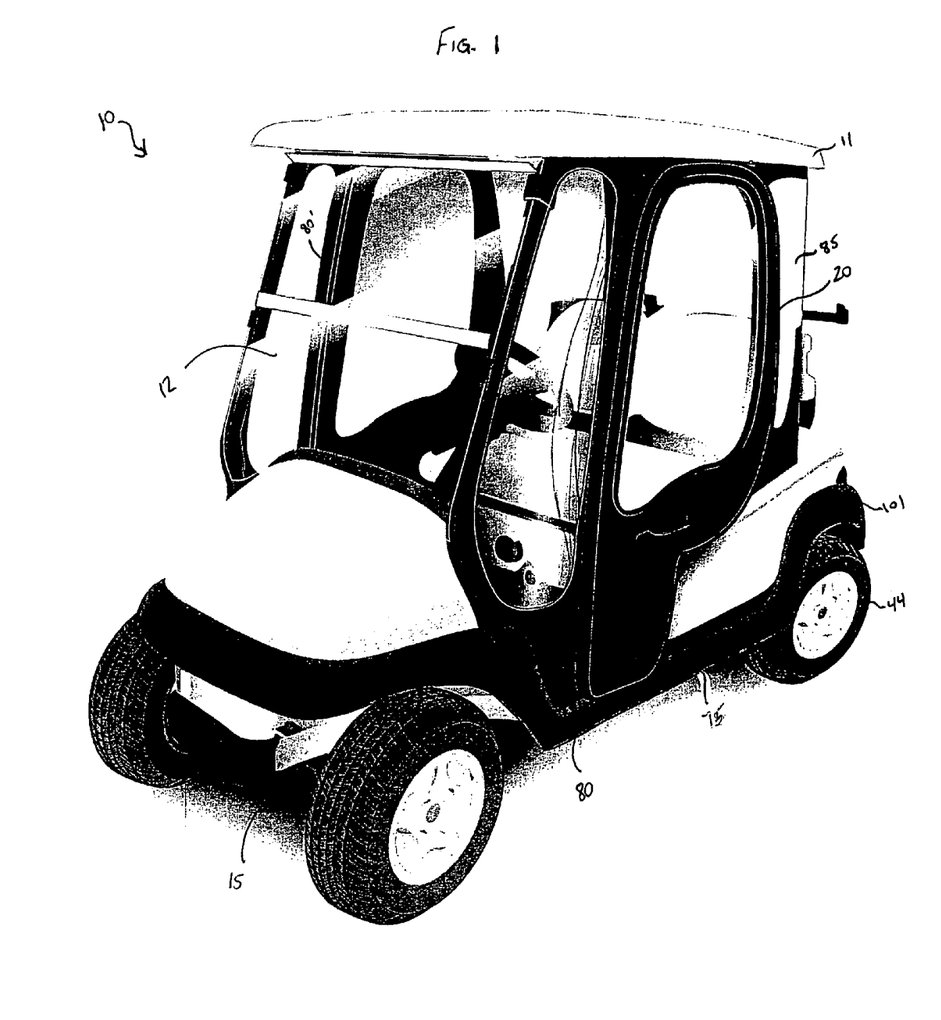
FIG. 1 is a perspective view of a golf cart including the door assembly of the present invention.
Figure 2:
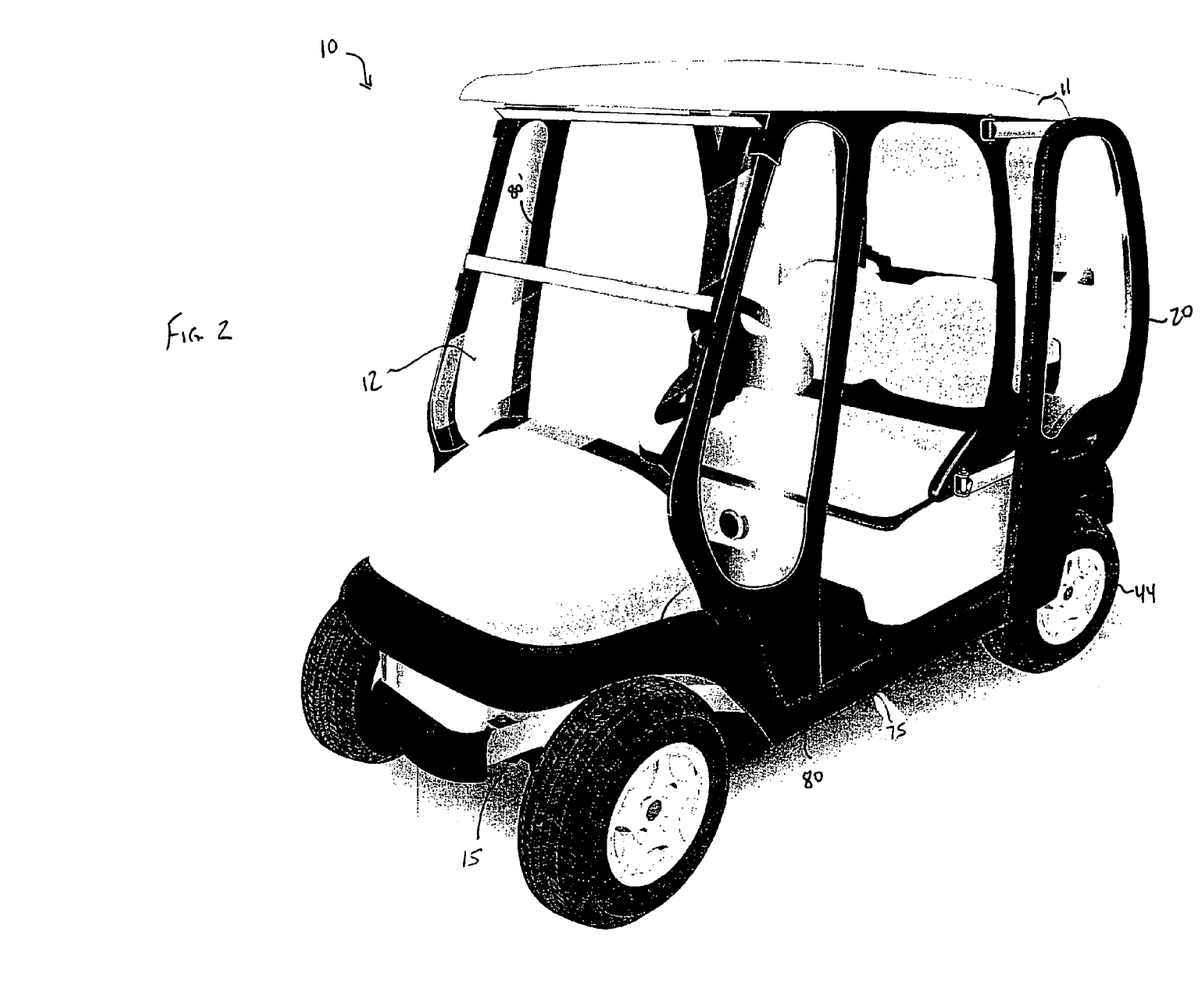
FIG. 2 is a perspective view of the golf cart of FIG. 1 with the door in the open position.

Turning first to FIG. 1, there is shown at 10 a vehicle such as a golf cart suitable for use with the present invention. Although not to be construed as limiting, the door assembly of the present invention can be used with golf carts manufactured by Club Car, EZ-GO and Yamaha, with preferably little or no modification to the vehicle itself. Those skilled in the art will also appreciate that the door assembly of the invention is not limited to use on a golf cart; the door assembly also can be used on vehicles such as recreational vehicles, NEV's and utility vehicles, although for ease of illustration, golf carts will be exemplified herein. In general, the vehicle 10 has front and rear wheels, a chassis 15, on which is built a normally open passenger compartment (with suitable seating, generally for two passengers), an existing roof 11 having suitable supports, and a windshield 12, as shown. Those skilled in the art will appreciate that the roof 11 and windshield 12 can be original equipment or added in the aftermarket. A pair of doors 20 in accordance with the present invention is shown in the closed position on opposite sides of the vehicle 10. The door assemblies are shown stored in the open position in FIG. 2. In the closed position, the doors close the access opening to the passenger compartment defined in part by the vehicle chassis, the roof and the windshield.

Figure 3:
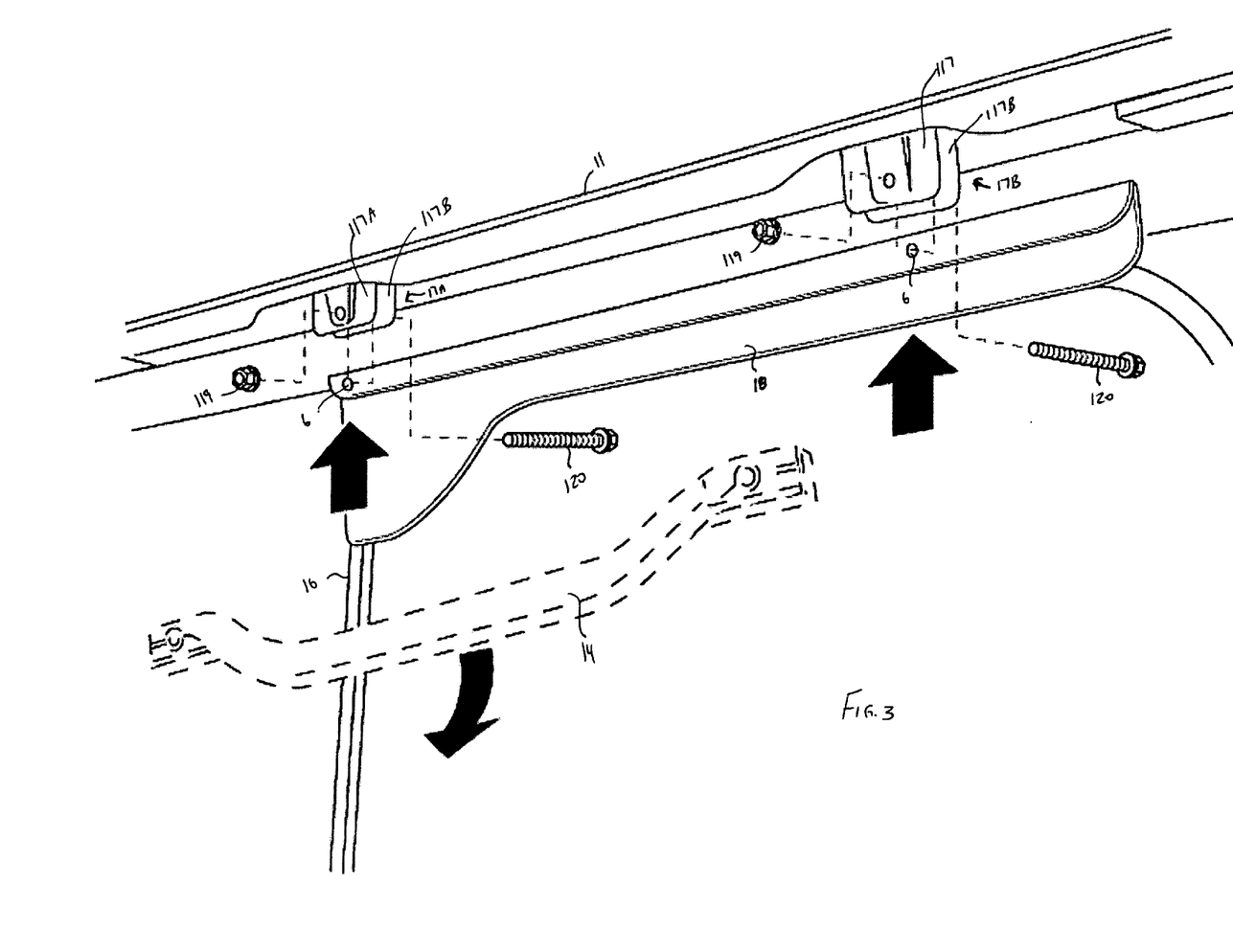
FIG. 3 is a perspective view of the top of the door frame showing the location of its attachment to the vehicle roof.

Preferably the door assembly of the present invention is attached to the vehicle with minimal modification to the vehicle itself, utilizing existing structure. To that end, as best seen in FIG. 3, the door frame 16 can be affixed to the underside of the existing roof 11 using existing brackets 17A, 17B. These brackets, each of which includes a pair of spaced flanges 117A, 117B are intended to support handle 14, shown in dotted lines in FIG. 3. The handle is removed, and doorframe bracket 18 is inserted in the spaces between flanges 117A and 117B and is secured to the brackets 17A, 17B by any suitable means, such as with respective nuts 119 and bolts 120 as shown by the dotted lines in FIG. 3. In the event the brackets 17A, 17B are not present in a particular vehicle, the doorframe can be affixed directly to the roof, or to suitable roof extensions or brackets that can be added. The doorframe bracket 18 preferably includes spaced holes that align with respective corresponding holes in the brackets 17A, 17B as shown.

Figure 4:
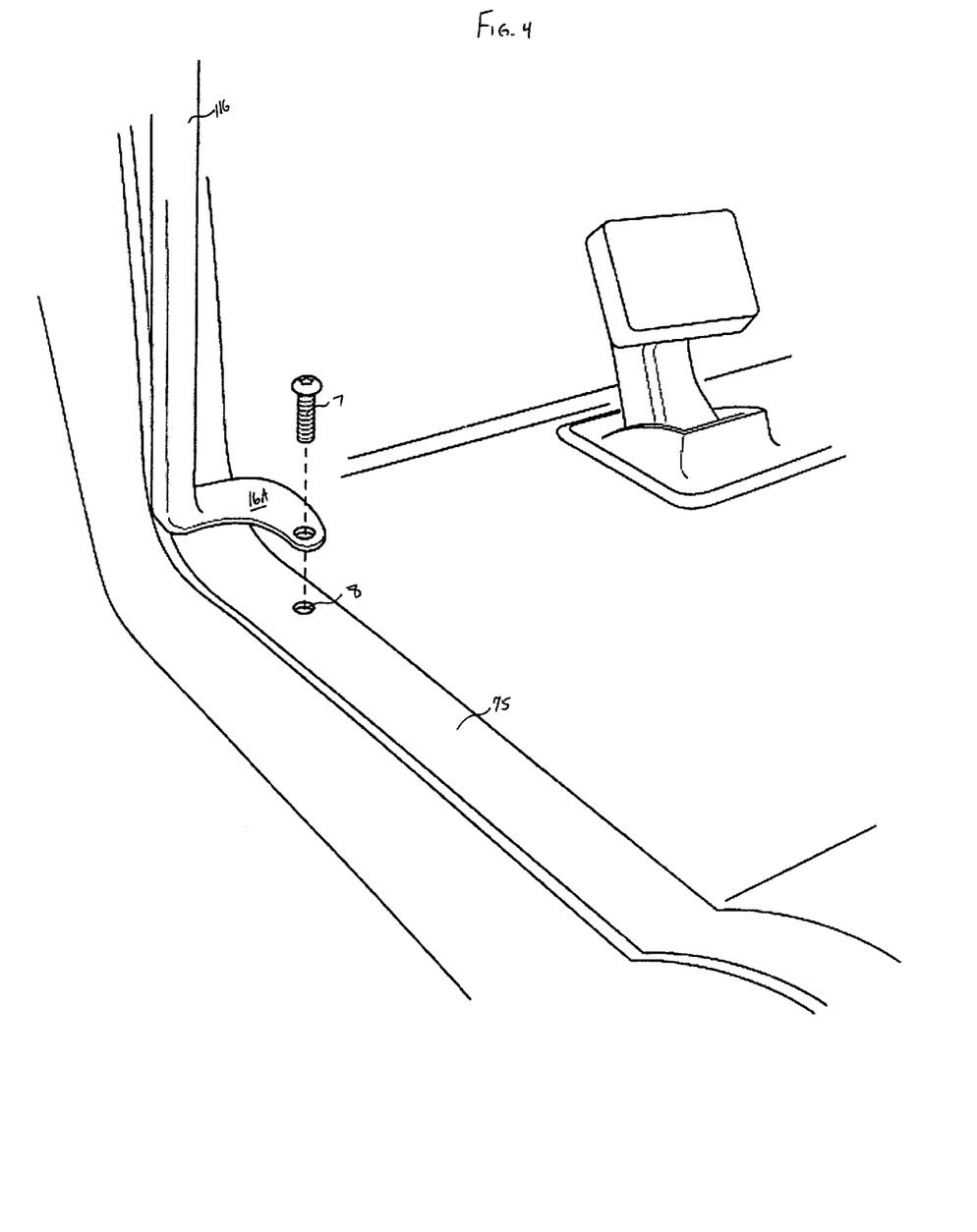
FIG. 4 is a perspective view of the bottom of the door frame showing the location of its attachment to the vehicle.
Figure 5:
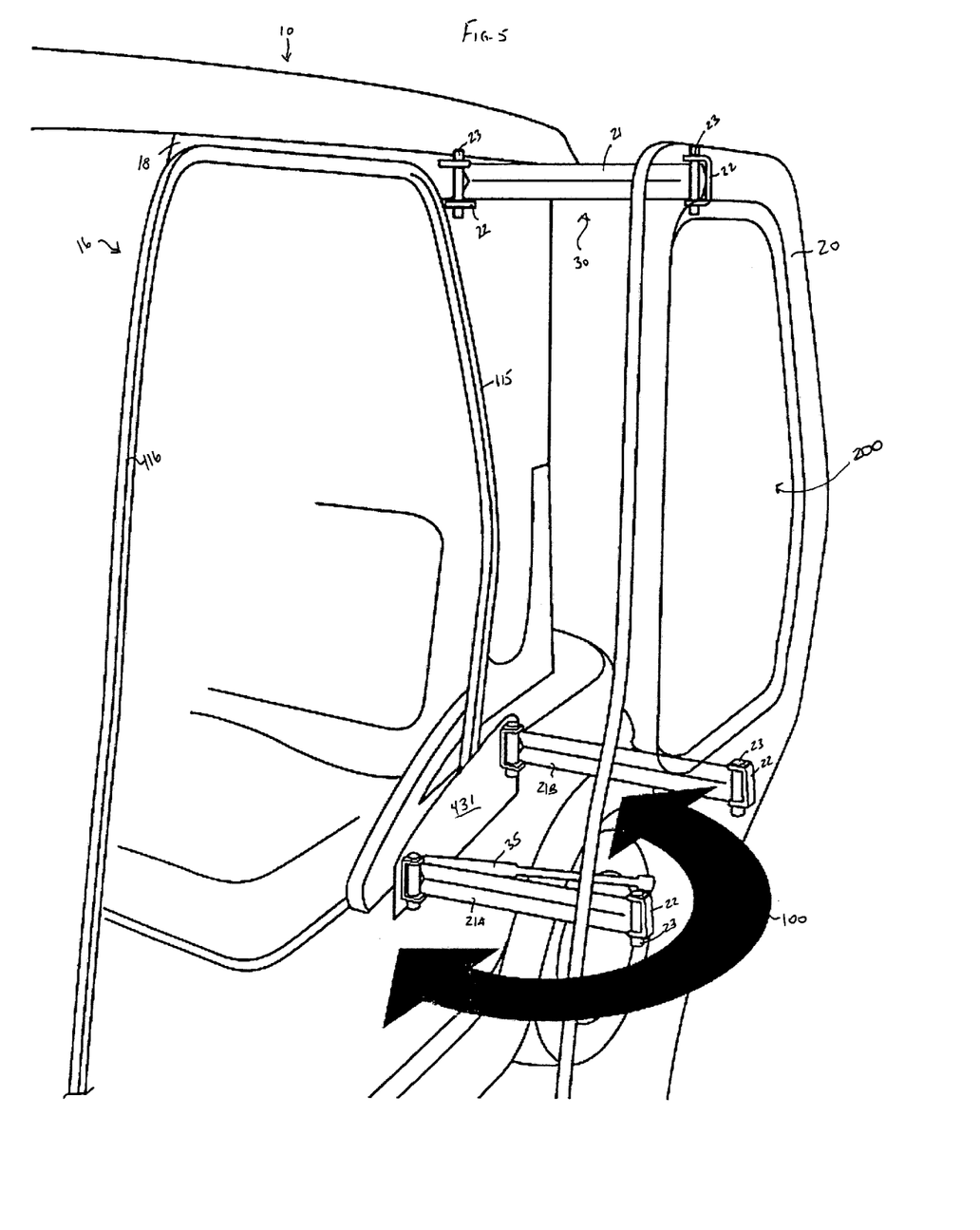
FIG. 5 is a perspective view of the door shown attached to the vehicle by an upper hinge system and a lower hinge assembly.

As best seen in FIG. 4, doorframe 16 includes an elongated member 116 that extends downwardly from the bracket 18 and terminates in a free foot end 16A that is secured to the vehicle bumper 75, such as by bolt 7. The elongated member 116 can be affixed to the bracket 18 by any suitable means, such as welding. A suitable hole 8 can be drilled in the bumper 75 for securing the free foot end 16A thereto. As seen in FIG. 5, The doorframe 16 also includes a second elongated member 115 that is spaced from the first elongated member 116 and extends downwardly from the bracket 18, and is secured to plate 431 preferably near the passenger seating area such as by welding. The second elongated member 115 can be affixed to the bracket 18 by any suitable means, such as by welding. In the preferred embodiment, the doorframe 16 is a continuous bent piece, and is preferably made of a rigid material, capable of withstanding repeated contact from the door itself. Suitable materials of construction include steel, preferably tubular for increased support, metal, aluminum and plastic, with steel being preferred. Although the doorframe 16 is intended to be permanently mounted to the vehicle and become an integral part thereof (since it does not interfere with a user entering or exiting the vehicle, nor does it interfere with the operation or storage of the vehicle), it can be readily removed if desired.

Door 20 is designed to fit within the doorframe 16 when the door is in the closed position, blocking ingress into and egress from the passenger compartment, and preferably closing in a weather-tight manner. Preferably the door 20 is made of a sturdy, durable, rigid material that can withstand harsh environmental conditions, golf ball impact, and protect the passengers from weather. Suitable materials of construction include metal, stainless steel, aluminum and preferably plastic such as a polyolefin, including polyethylene and/or polypropylene. Preferably the door includes molded plastic supported about its perimeter by a tubular steel framework, and includes a transparent or translucent window portion 200 to permit the passengers viewing access to the exterior of the vehicle. The window portion 200 can be formed of acrylic, polycarbonate or glass.

Figure 6:
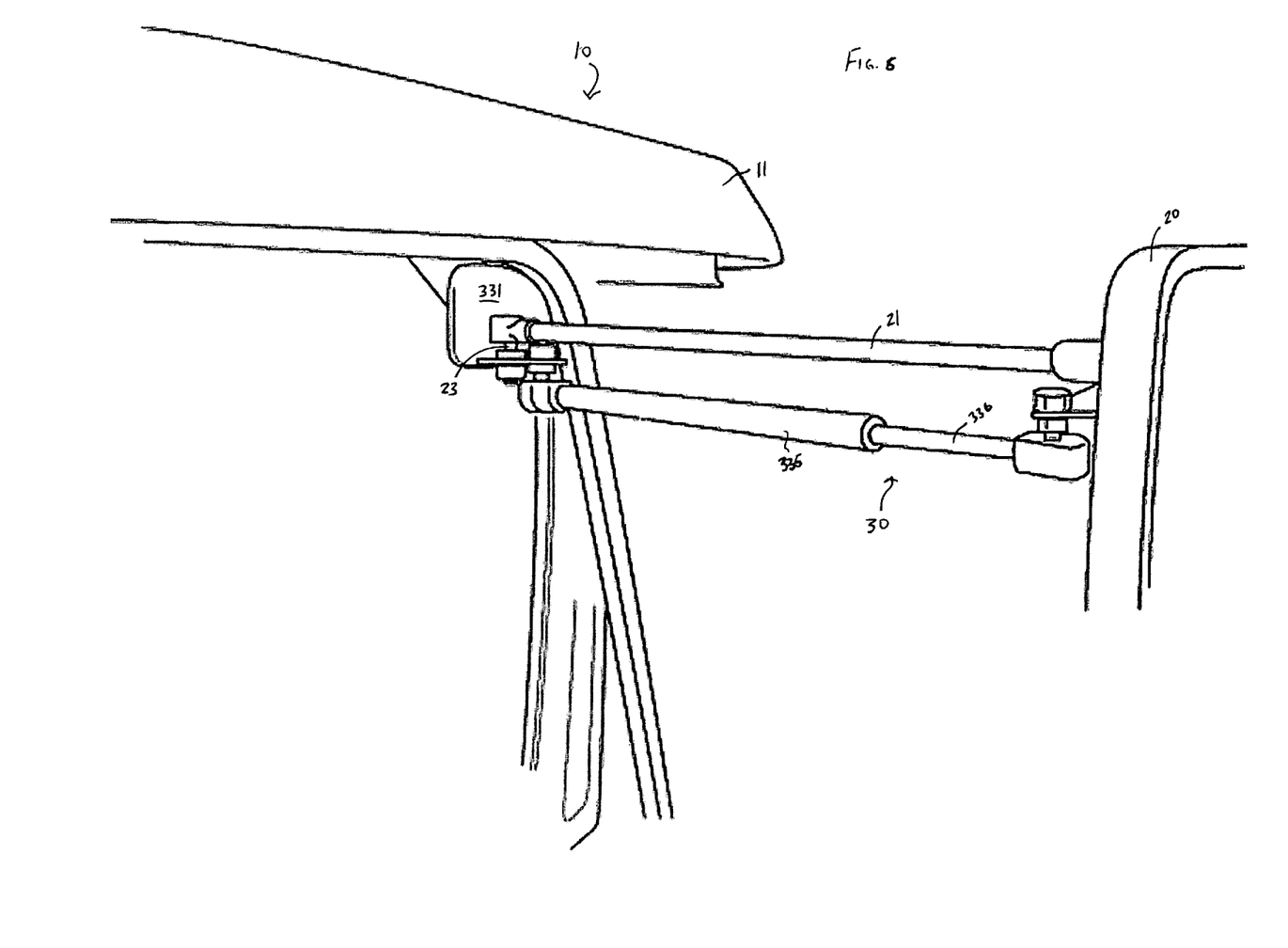
FIG. 6 is a perspective view of the upper door hinge assembly shown attached to the door and the vehicle.
Figure 7:
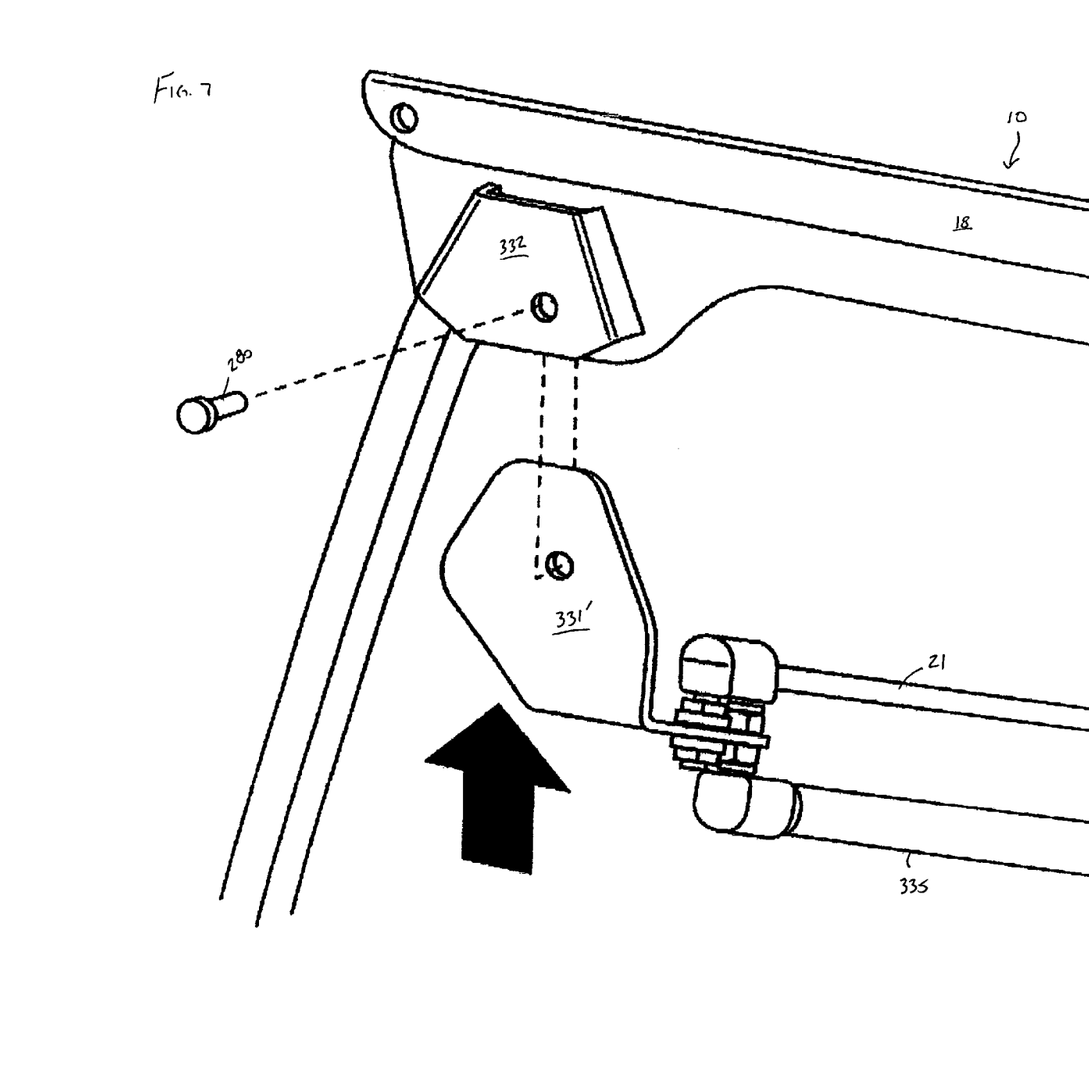
FIG. 7 is a perspective view of a mount for the upper door hinge assembly.

Turning now to FIGS. 5-7, a preferred embodiment of the door hinge assembly is shown. An upper hinge assembly 30 includes a rigid member 21 such as a threaded rod (FIG. 6) or a metal strip (FIG. 5) having a first end pivotally attached to the door 20, and a second opposite end pivotally attached to the vehicle 10 via bracket 331. Each of the pivot points can be formed using any suitable means, such as a pin 23 arrangement as shown. FIG. 7 illustrates one embodiment for mounting the upper hinge assembly to the cart 10. The rigid member 21 and optional assist 335 are pivotally mounted to bracket 331' as shown. Bracket 331' is shaped to be received by receiving bracket 332 that is mounted to the cart 10. When bracket 331' is properly positioned in receiving bracket 332, holes in each align, allowing insertion of a bolt, pin or preferably a spring-loaded quick release pin 280 to removably secure the assembly to the cart.

The upper hinge assembly 30 optionally also includes an assist 335, preferably a gas spring, compression of which causes energy to be stored in the device. The assist 335 is preferably mounted directly below (or above) the rigid member 21 (in the same vertical plane), but with offset pivot points located inwardly of the rigid member pivot points. Suitable pivot mounting configurations include eyelets and ball and socket configurations. When the door is positioned at the midpoint between the open and closed position (the position shown in FIG. 5), the assist 335 is in a neutral position. As the door swings past the midpoint position (either towards a closed position or an open position), the energy stored in the assist 335 is slowly released, causing the rod 336 of assist 335 to extend, which in turn assists in forcing the door to its closed or open position, as the case may be. When in the open or closed position, the extension of rod 336 results in the length of the assist 335 exceeding the length of rigid member 21. The assist 335 also helps maintain the door in the open or closed position.

Figure 5A:
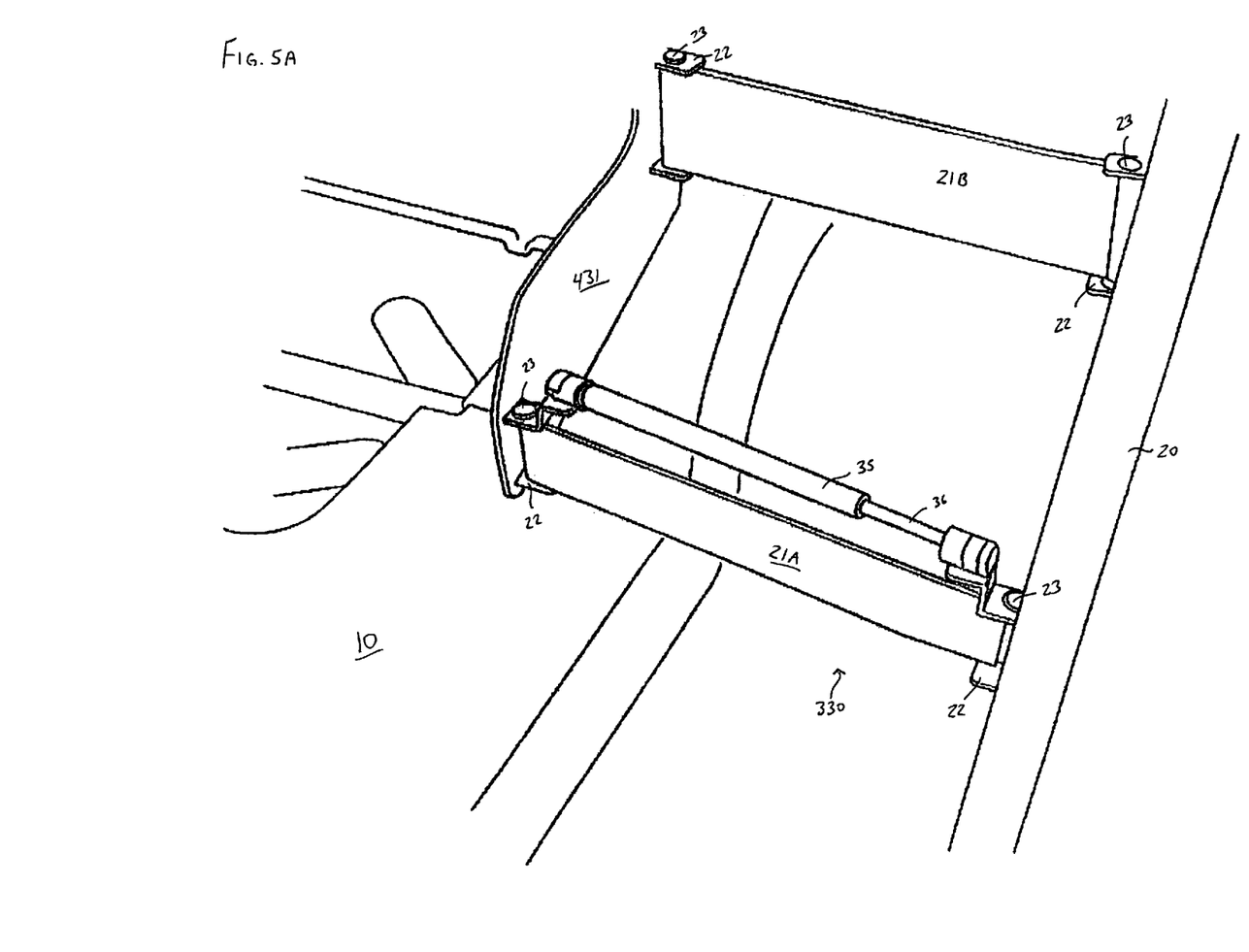
FIG. 5A is a perspective view of the lower hinge system in accordance with the present invention.

FIG. 5A illustrates lower hinge assembly 330, which includes a pair of spaced rigid members 21A, 21B, each having a first end pivotally attached to the door 20, and a second opposite end pivotally attached to the vehicle 10 via plate 431. Preferably the rigid members 21A and 21B are not horizontally aligned in order to ensure clearance during operation of the door 20. The rigid members 21A and 21B are of equal length, and are equal in length to rigid member 21 of upper hinge assembly 30, so that the door remains aligned with the frame. The rigid members 21, 21A and 21B are all preferably parallel. The particular length chosen for the rigid members depends upon the distance (the diameter of the semi-circle formed during the path of door travel) desired for the door to open/close, as discussed in greater detail below. Each of the pivot points can be formed using any suitable means, such as a C-bracket 22 a pin 23 arrangement as shown. Preferably at least one of the pin arrangements is adjustable, so that proper alignment of the door is ensured. The lower hinge assembly 330 also preferably includes an assist 35 to help open and close door 20, such as a gas spring, compression of which results in energy being stored in the device. The assist 35 is preferably mounted directly below (or above) the rigid member 21A (in the same vertical plane), but with pivot points located inwardly of the rigid member 21A pivot points. As with assist 335, when the door is positioned at the midpoint between the open and closed position, the assist 35 is in a neutral position. As the door swings past the midpoint position (either towards a closed position or an open position), the energy stored in the assist 35 is slowly released, causing the rod 36 of assist 35 to extend, which in turn assists in forcing the door to its closed or open position, as the case may be, and maintaining it in that state. Those skilled in the art will appreciate that for optimal operation of the door, at least three rigid members 21 should be used. Although in the embodiment shown, there is one upper rigid member 21 and two lower rigid members 21A, 21B, the upper hinge assembly could include two or more rigid members. Similarly, the lower hinge assemble could include only one rigid member 21, or two or more.

Figure 8:
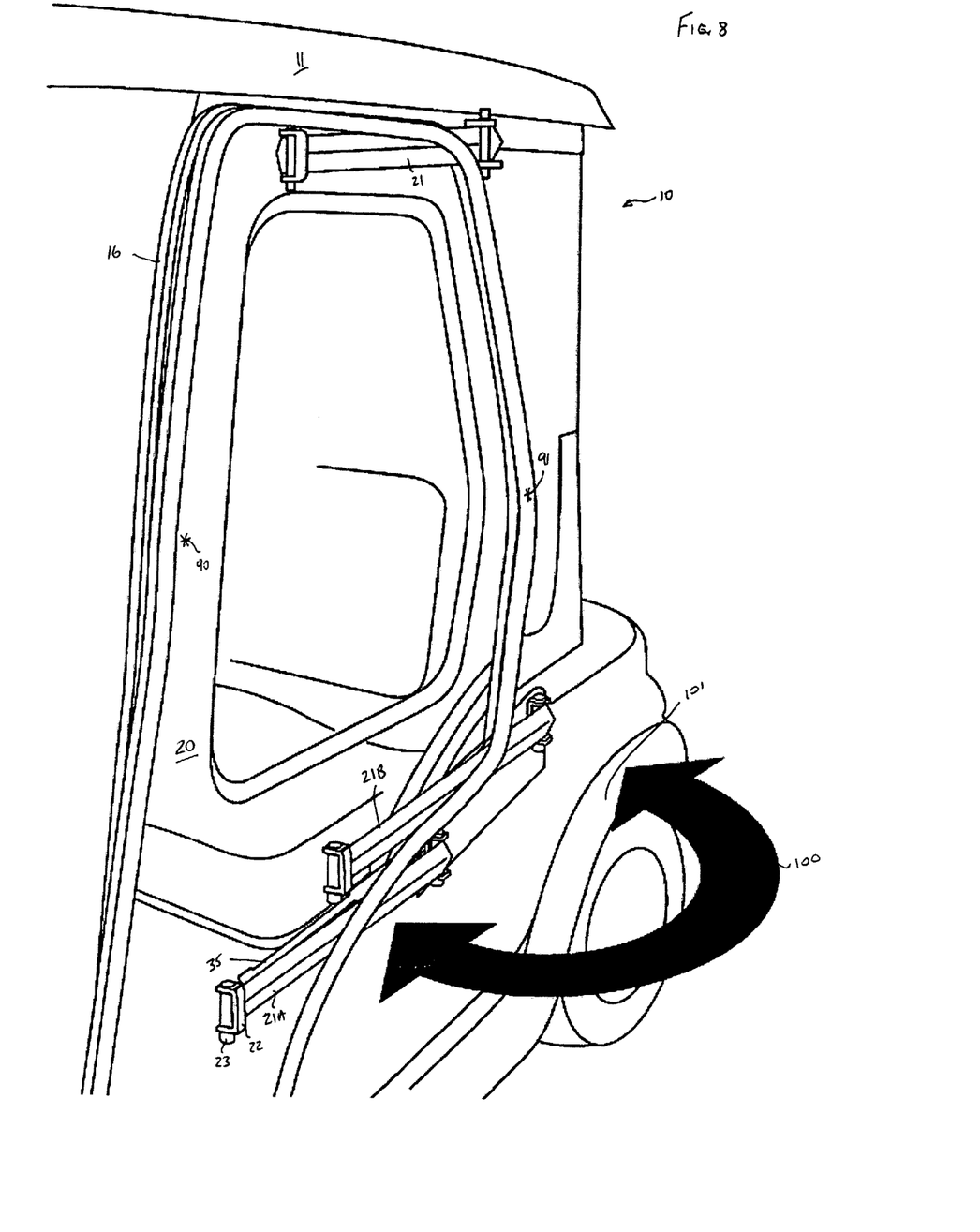
FIG. 8 is a perspective view of the door assembly shown in the closed position.
Figure 9:
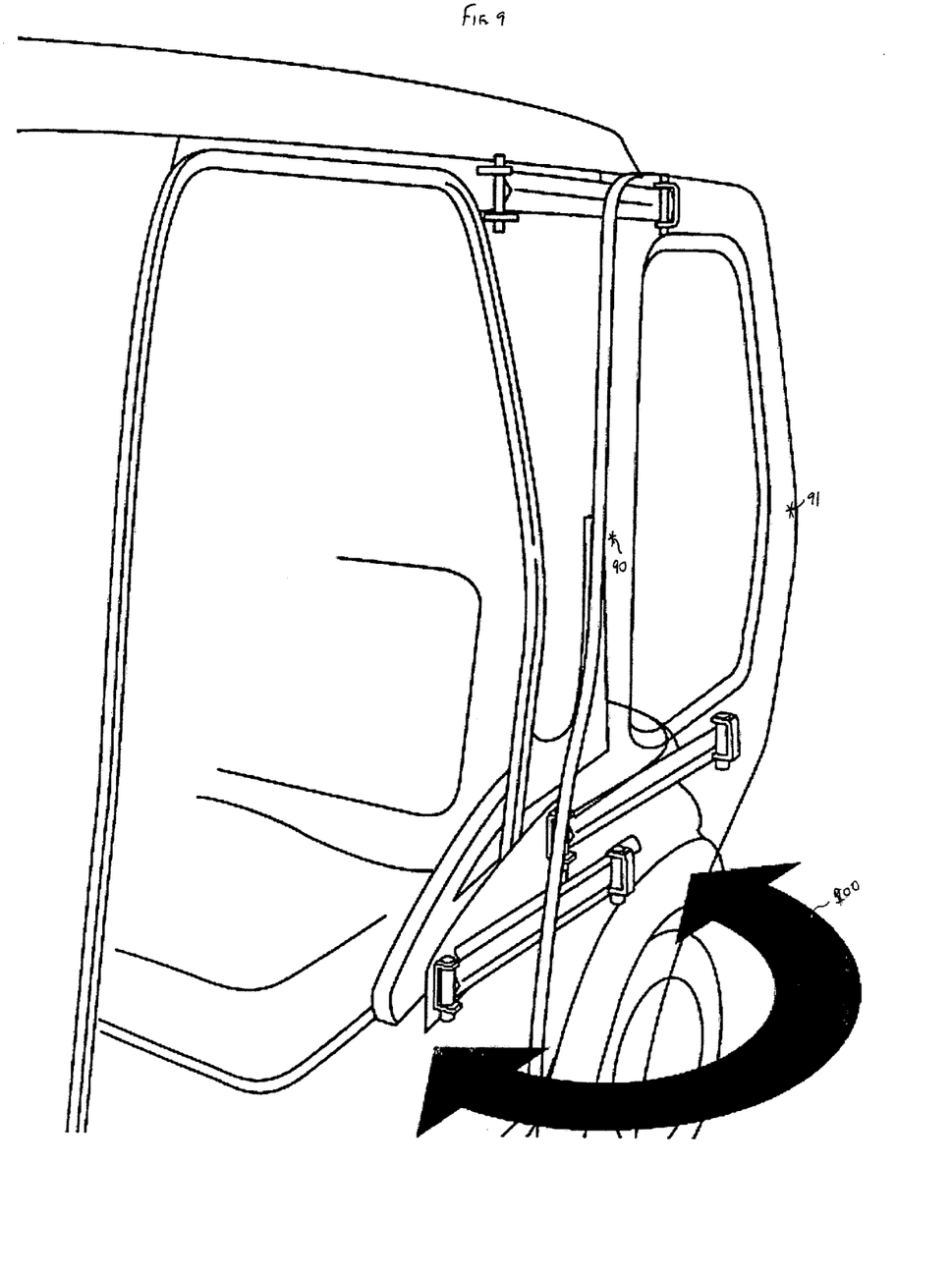
FIG. 9 is a perspective view of the door assembly shown in the open position.

Turning now to FIGS. 8 and 9, the motion of the door 20 from the closed state (FIG. 8) to the open state (FIG. 9) is shown. As the door is moved from the closed state to the open state, or from the open state to the closed state, its path of travel defines a semi-circle, as depicted by arrow 100 in FIGS. 8 and 9. The semi-circle so defined is of equal diameter regardless of the reference point of the door used. For example, the semi-circle defined by the path of travel of reference point 90 on the front surface of the door as shown in FIGS. 8 and 9 has the same diameter as the semi-circle defined by the path of travel of reference point 91 at the opposite marginal side on the front surface of the door 20, or for that matter, of any other reference point at any other place, on the same surface of the door. Similarly, the paths of travel of the rigid members 21, 21A and 21B also define semi-circles of equal diameters as viewed from reference points at the same relative position on each rigid member. As a result, opening and closing of the door 20 can be carried out even when the vehicle is in a confined space. Indeed, substantially less clearance is required than that of a door of identical size that is hinged at one end and swings outwardly, as the maximum distance the door 20 of the present invention moves outwardly from the vehicle is less than the maximum width of the door 20.

As seen in FIGS. 1 and 8, preferably the lower rearward side of the door 20 is arc-shaped, configured to match the contour of rear wheel fender 101. As a result, when the door is in the open position (FIGS. 2 and 9), it does not interfere with the operation of the rear wheel 44, and creates an aesthetically pleasing appearance. As indicated above, the distance that the door 20 is designed to open is dictated by the length of the rigid members 21, 21A and 21B. Accordingly, this length preferably is chosen so that the lower arc-shaped portion of the door 20 aligns with the similarly shaped fender (or wheel well) of the vehicle when the door 20 is in the open, stored position.

Figure 10:
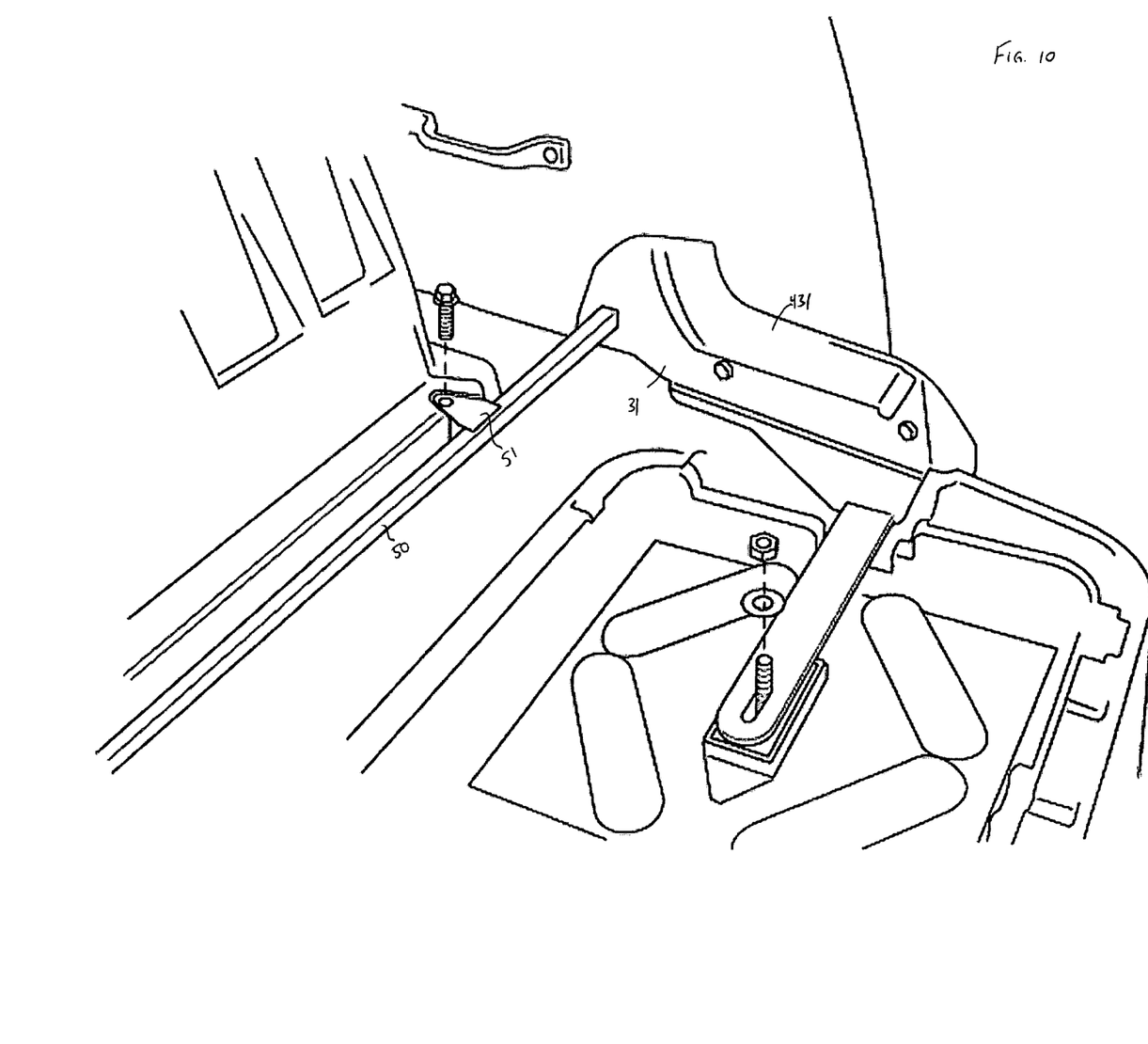
FIG. 10 is a perspective view of the plate assembly for removably engaging the door.

FIG. 10 illustrates a preferred design for securing the plates 31 in place. In this embodiment, the plate 31 on each side of the cart is affixed to a traversing rod 50. The rod 50 spans the width of the vehicle 10, and is secured to the vehicle by any suitable means. For example, the rod 50 can include a flange 51 that is bolted underneath the passenger seat, preferably at multiple locations to ensure it's stability.

Figure 11:
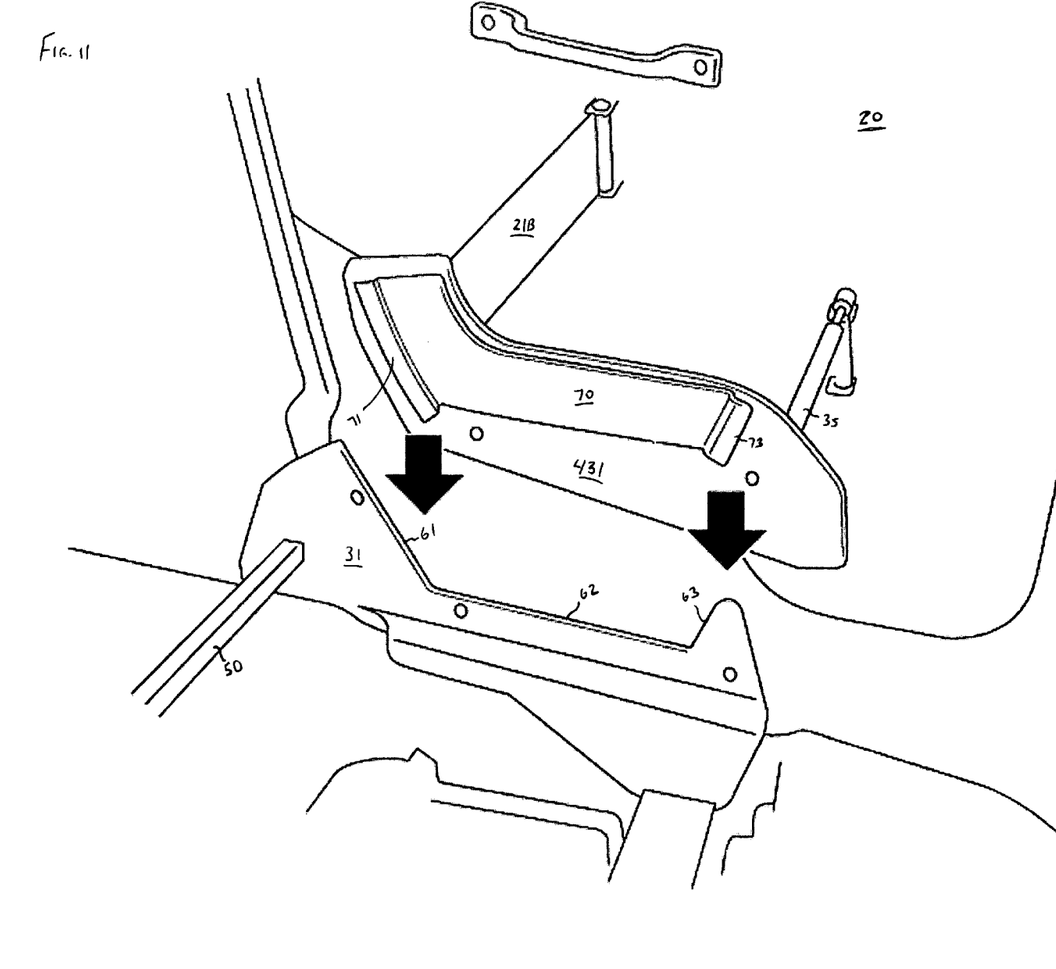
FIG. 11 is a perspective view showing the engagement of the plate assembly and the door.

As illustrated in FIG. 11, the door 20 is easily attached and removed from the vehicle using a self-aligning plate assembly. To that end, plate 31 has a trapezoidal shape, defined by downwardly sloped side 61, bottom 62 and upwardly sloped side 63. Plate 431 includes a bracket 70 secured thereto, such as by welding, the bracket 70 including a first bent flange 71 that with plate 431, is shaped and dimensioned to define a gap to slidingly engage side 61 of plate 31. Bracket 70 also includes a second bent flange 73 that together with plate 431, is shaped and dimensioned to define a gap to slidingly engage side 63 of plate 31. Accordingly, to mount the door 20 to the vehicle, the door 20 is positioned so that the bracket 70 is vertically positioned over plate 31 so that bent flange 71 is aligned over side 61, and bent flange 73 is aligned over side 63. The door 20 is then moved downwardly, in the direction of the arrows in FIG. 11, so that bracket 70 slidingly receives plate 31 and retains the door in place. In view of the trapezoidal shape of the plate 31 and bracket 70, the mating of the two is self-aligning. Quick-release pins can be used to further secure the plate 431 to the plate 31. Upper hinge assembly 30 is attached by sliding bracket 331' into receiver 332 (FIG. 7) and securing it in place with pin 280.

To dismount the door 20, the quick-release pins are removed, and the door is lifted from the plate 31 and the upper hinge assembly 30 is removed from receiver 332.

Turning back to FIG. 1, there is shown front panels 80, 80'. The panels 80, 80' are preferably permanently installed, since they do not interfere with the ingress or egress from the passenger compartment, although the panels could be made to be removable if desired. Each panel is secured to a windshield support strut and to doorframe elongated member 116, and is preferably a molded piece made of plastic. The panels 80, 80' preferably include a transparent or translucent window made of acrylic, polycarbonate or glass to enhance passenger visibility. The edge of each panel abutting the closed door is preferably formed with a groove to receive the door edge when the door is in the closed state. Back panels 85 can be included to further enclose the passenger compartment. Preferably the back panels 85 are secured to the roof supports, roof and doorframe elongated member 115.

To further retain the door 20 in its open and/or closed position, an optional manually operable latch can be used that attaches to the elongated member 116 in the door-closed state, and to elongated member 115 in the door-open state. Alternatively or in addition, magnets can be used to retain the door open or closed.

What is claimed is:

1. A door assembly for managing access to the interior of a vehicle, comprising:
    a door having a surface;
    a hinge assembly for removably connecting said door to said vehicle, said hinge assembly, when attached to said vehicle, providing a path of door travel from a door closed state to a door open state such that any two points on the same surface of said door travel in semi-circles of the same diameter, said hinge assembly comprising three rigid members, each respectively connecting a pair of spaced pivot locations, wherein said three rigid members are each in different horizontal planes.

2. The door assembly of claim 1, wherein said hinge assembly comprises upper and lower hinges for removably connecting said door to said vehicle.

3. The door assembly of claim 1, wherein said hinge assembly comprises an assist for biasing said door to said open or closed position upon said door passing through its midpoint of travel.

4. The door assembly of claim 3, wherein said assist comprises a gas spring.

5. The door assembly of claim 3, wherein said assist retains said door in said open or closed position.

6. The door assembly of claim 1, further comprising a doorframe mounted to existing structure on said vehicle.

7. The door assembly of claim 1, wherein said vehicle has a rear wheel well, and wherein the contour of said door is shaped to match the contour of said rear wheel well.

8. The door assembly of claim 1, wherein said hinge assembly further comprises a bracket shaped and dimensioned to slidingly engage a trapezoidal plate to mount said door to said vehicle.

9. The door assembly of claim 8, wherein said engagement of said bracket and said plate self-align said door.

10. The door assembly of claim 1, wherein said vehicle is a golf cart.

11. A door assembly for managing access to the interior of a vehicle, comprising:
    a door frame adapted to be affixed to the vehicle;
    a door;
    a hinge assembly for connecting said door to said vehicle, said hinge assembly comprising at least three rigid members pivotally attached to said door and to said vehicle at pivot locations each pivoting about different pivot axes, said at least three rigid members being in different horizontal planes, the lengths of which defining the distance of travel of said door from a door closed state to a door open state.

12. The door assembly of claim 11, wherein said hinge assembly further comprises at least one assist for biasing said door to said open or closed state upon said door passing through its midpoint of travel.

13. The door assembly of claim 11, wherein said at least one assist comprises a gas spring.

14. The door assembly of claim 11, wherein one of said rigid members defines an upper hinge, and wherein two of said rigid members define a lower hinge.

15. The door assembly of claim 11, wherein said vehicle is a golf cart.

16. The door assembly of claim 1, wherein said door is manually operable.

17. The door assembly of claim 11, wherein said door is manually operable.

18. The door assembly of claim 11, wherein said hinge assembly provides a path of door travel from a door closed state to a door open state such that any two points on the same surface of said door travel in semi-circles of the same diameter.

* * * * *